(12) United States Patent
Soliman

(10) Patent No.: US 7,415,492 B2
(45) Date of Patent: Aug. 19, 2008

(54) TIPS CALCULATOR

(76) Inventor: Mahmoud Soliman, 15305 SW. 141 Ter., Miami, FL (US) 33196

( * ) Notice: Subject to any disclaimer, the term of this patent is extended or adjusted under 35 U.S.C. 154(b) by 1056 days.

(21) Appl. No.: 10/064,270

(22) Filed: Jun. 27, 2002

(65) Prior Publication Data

US 2003/0005004 A1    Jan. 2, 2003

Related U.S. Application Data

(60) Provisional application No. 60/301,358, filed on Jun. 27, 2001.

(51) Int. Cl.
*G06F 15/04* (2006.01)
(52) U.S. Cl. .................................... 708/130
(58) Field of Classification Search ............. 708/160, 708/134, 200–209, 110, 163, 130; 705/400
See application file for complete search history.

(56) References Cited

U.S. PATENT DOCUMENTS

| | | |
|---|---|---|
| 4,028,529 A | 6/1977 | Van De Weghe |
| 4,458,320 A | 7/1984 | Sutton |
| 4,988,025 A * | 1/1991 | Lipton et al. ............. 708/163 |
| D333,743 S | 3/1993 | Johnson |
| 5,933,812 A * | 8/1999 | Meyer et al. ............. 705/15 |
| 5,964,823 A * | 10/1999 | Terriss et al. ............ 708/160 |
| D420,382 S | 2/2000 | Dressel |
| 6,076,079 A | 6/2000 | Boston et al. |
| 6,591,281 B1 * | 7/2003 | Kawasaki ................ 708/110 |

OTHER PUBLICATIONS

Jim DelaHunt, Tip Calculators, Oct. 9, 1999, ZATZ Publisher at http://www.palmpower.com/issuesprint/issue199801/tipcalc.html.*
Ilium Software, Tipster™, website available at http://www.iliumsoft.com/tipster.htm.

* cited by examiner

*Primary Examiner*—Chat C Do
(74) *Attorney, Agent, or Firm*—Lambert & Associates; Gary E. Lambert; Craig Dorais

(57) ABSTRACT

A novel calculator and methods for using same for calculating tips with ease and without requirement for knowledge of necessary tip calculating formulas. Three groupings of buttons provide buttons for entry of the check amount, calculation of the tip amount, and calculation of individual share to contribute to the bill and tip if there is more than one person being presented with a check. Pre-programmed calculating functions make tip calculation easy and convenient for anyone.

4 Claims, 4 Drawing Sheets

TIPS CALCULATOR

CROSS REFERENCE TO RELATED APPLICATIONS

This application claims the benefit of provisional application, Ser. No. 60/301,358 filed Jun. 27, 2001.

BACKGROUND OF INVENTION

The present invention relates to calculators. Specifically, it relates to calculators used to compute the amount of the tip that user would want to leave after obtainment of such services as being served with food, getting a cab fare, and in any other circumstance when it is customary to leave a gratuity tip.

Almost everyone encounters a frequent need to leave a tip after a meal, after a cab ride, or after being served in other ways. Almost at every one of these occasions one has to pause and try to perform a mental calculation of just how much to tip. This problem is further complicated when a group of people are served, for example, at a dinner table in a restaurant. Now there is a need to calculate how much each person in the group has to pay for his or her meal and on top of it there is a need to calculate how much he or she should contribute to the tip.

Moreover, a customary amount for the tip that is a certain percentage of the charge may vary from industry to industry. In addition, a person leaving a tip might want to leave a greater or lesser amount than what would be considered the norm depending on the degree of satisfaction with the service received. Existence of so many different mathematical problems in tip calculation often confuses people and may even embarrass those who are not comfortable with performing mathematical calculations in their head. Of course, one can always use a regular calculator, but the required calculations involve a number of steps that many people are unfamiliar with, while a majority of the public simply doesn't even carry calculators as they go about everyday business.

All of these problems could be solved easily and conveniently with the present invention.

SUMMARY OF INVENTION

The invention disclosed in this application, the tips calculator, represents a calculator that has a number of buttons with corresponding preset calculating functions. The difference between the tips calculator and a regular calculator is that the tips calculator has all the necessary tip calculating steps pre-programmed into the functions of the buttons. Additionally, the arrangement of the buttons on the tips calculator allows for easy intuitive operation by anyone regardless of their mathematical skills.

Therefore, it is the object of the present invention to provide a tips calculator for a convenient calculation of a tip amount to be paid by a single user.

It is another object of the present invention to provide a method of calculation of the tip amount for a single user using the tips calculator.

Additionally, it is another object of the present invention to provide a tips calculator for a convenient calculation of a tip amount to be paid by each individual user in a group.

Yet another object of the present invention is to provide a method of calculation of the tip amount for each user in a group using the tips calculator.

BRIEF DESCRIPTION OF DRAWINGS

These and other features, aspects and advantages of the present invention will become better understood with reference to the following description, appended claims, and accompanying drawings where:

DETAILED DESCRIPTION

Figure 1:
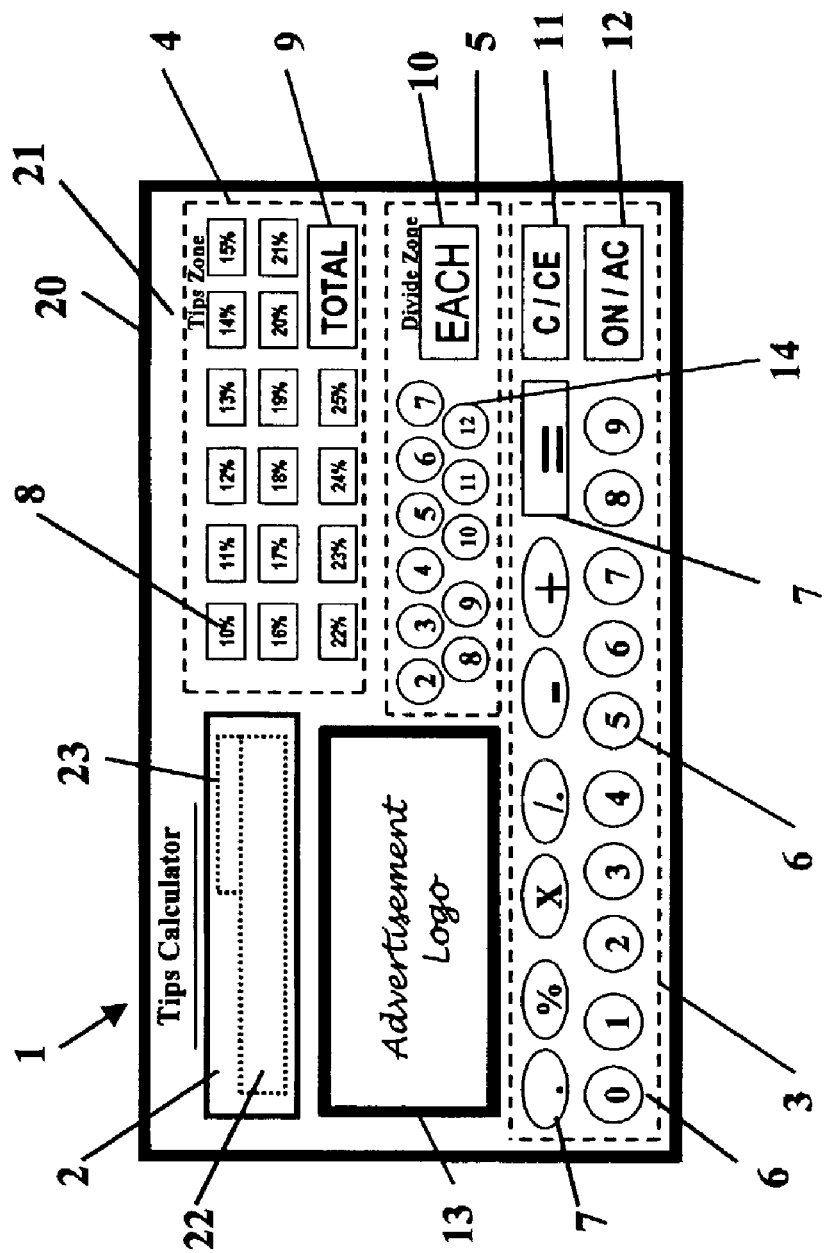
FIG. 1 is a front view of the tips calculator having a standard, "credit card" shape.
Figure 2:
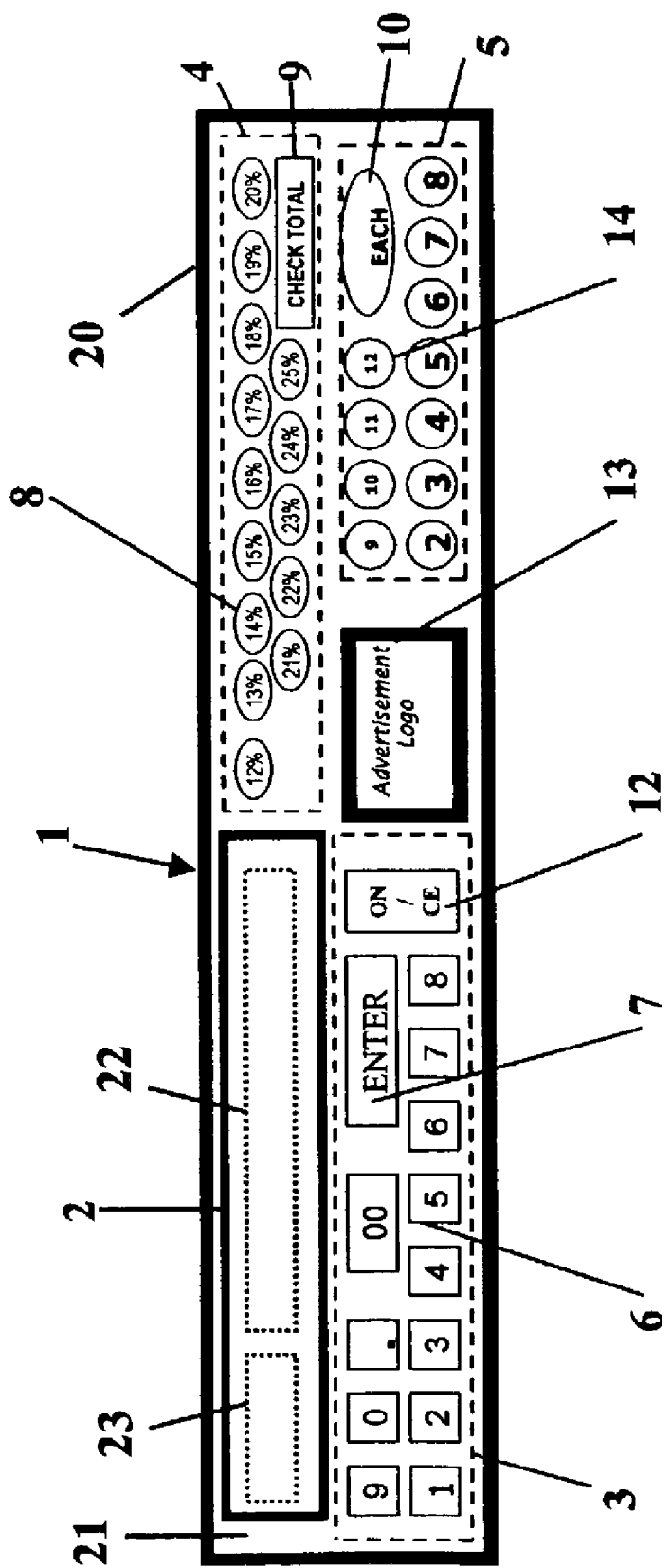
FIG. 2 is a front view of the tips calculator having an oblong, "ruler" shape.

The present invention is a tips calculator 1, as shown in FIGS. 1 & 2, that is designed and pre-programmed to assist in performing of tip calculations.

The tips calculator 1 is comprised of a base member 20. The base member 20 has a face side 21. The face side 21 has a display screen 2 and a plurality of groupings of buttons. The plurality of groupings of buttons is comprised of a first grouping of buttons 3, a second grouping of buttons 4, and a third grouping of buttons 5, as shown in FIGS. 1 and 2.

The first grouping of buttons 3 includes buttons designating whole numbers 6 from "0" to "9", and buttons designating at least mathematical functions 7 of a decimal point (.), addition (+), subtraction (−), multiplication (×), division (/), and sum total (=). The first grouping of buttons 3 is used to enter in a bill amount and such entry could be done by a waiter or whoever else performed the service. The bill amount will appear on a main display area 22 of the display screen 2.

The first grouping of buttons 3 could also have such buttons as an on button 12 marked as "ON/AC" button for turning on of the tips calculator 1, and a clear button 11 marked as "C/CE" button for clearing of the main display area 22 from any previously entered or obtained values.

The first grouping of buttons 3 can also have an off button for turning off of the tips calculator. The off button is not shown in FIGS. 1 & 2 since in the shown preferred embodiments, the tips calculator 1 could have a timing mechanism for turning off of the tips calculator 1 after a certain time of non use, which mechanism has a construction that is well known in the art.

The first grouping of buttons 3 could also be used for performing regular types of calculations performed with a calculator, thus providing a convenient two in one arrangement since the same device could be used as a regular calculator and as a tips calculator 1.

The second grouping of buttons 4 includes buttons designating tip amounts as percentages of the bill amount 8 as shown in FIGS. 1 & 2. For example, there could be a button that has "10%" drawn on it, another button with "11%", another with "12%" and so on, in one percent increments up to "25%" or some other appropriate limit for the highest tip. The user would see the bill amount on the main display area 22 of the display screen 2 and press a button that indicates the desired amount of tip percentage, for example a "20%" button. Each button designating a tip amount as a percentage of the bill amount 8 in the second grouping of buttons 4 is programmed to engage the tips calculator 1 to perform a series of calculations, which calculate the tip amount for the chosen percent of the tip. In effect, if the bill amount was $100.00, a single press of a "20%" button will result in main display area 22 showing "20.00" (result of 100.00×0.2).

The second grouping of buttons 4 also includes a button for a total amount 9, which could be marked as "TOTAL" button 9, as shown in FIG. 1. The total amount is a sum of the bill amount and the tip amount. A single press of the "TOTAL" button 9 will automatically add up the bill amount and the tip amount and display the sum on the main display area 22. In our example, the main display area 22 would now show the total amount of "120.00" (result of 100.00+20.00). Now the user knows how much money he or she should pay without trying to perform all the necessary calculations in his or her head.

Figure 3:
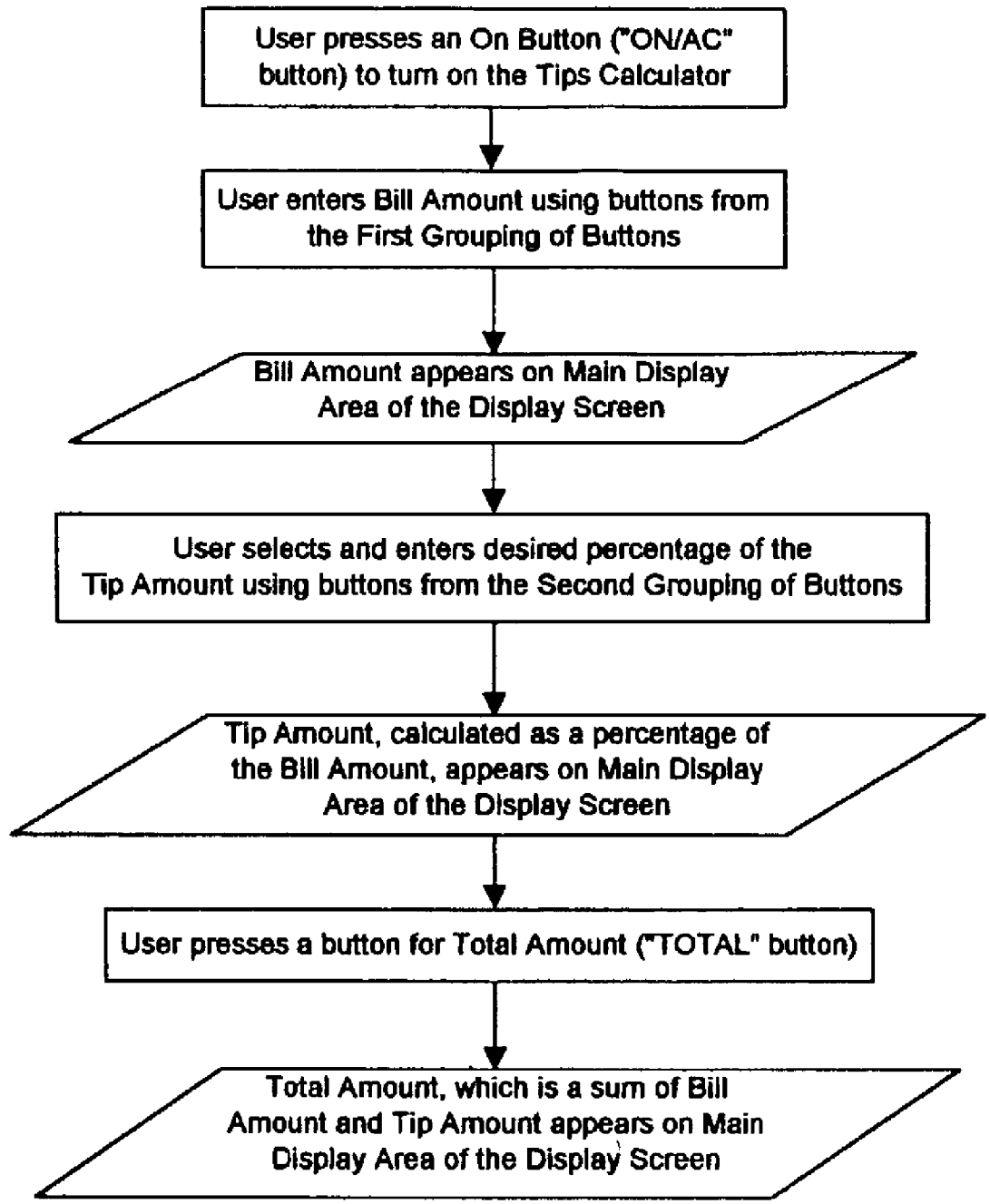
FIG. 3 is a flow chart of the method of calculation of the tip amount using the tips calculator.

The above-described method of calculation of the tip amount by a single user is outlined in the flow chart of the FIG. 3.

The third grouping of buttons 5 is there to assist groups of people who are served together. The third grouping of buttons 5 includes buttons designating numbers of members in a group 14 as whole sequential numbers such as "2", "3", "4", and so on up to "12" or some other convenient number, as shown in FIGS. 1 & 2. A single press of a button designating a number of members in a group 14 in the third grouping of buttons 5 will engage the tips calculator 1 to compute an individual share, which is a product of a division of the total amount by the number of members in a group, and display the individual share on the main display area 22. For example, if the total amount to be paid together with a 20% tip was $120.00, and there were 4 people at the table dining together, then a single press of a "4" button in the third grouping of buttons 5 will engage the tips calculator 1 to compute an individual share, and the main display area 22 will display "30.00" (result of 120÷4). Now each member of the four-person group would know that his or her share is $30.00 to be contributed to the total amount, which includes the bill amount and the tip amount.

The third grouping of buttons 5 could also have a share button 10, which could be marked as "EACH" button. In conjunction, the display screen 2 would have a share display area 23. Pressing of share button 10 (marked as "EACH" button 10 in FIGS. 1 & 2) prompts display of the individual share in the share display area 23 of the display screen 2 during performance of consecutive calculations on the tips calculator 1. Thus, the user can compare what his individual share would be if a different percentage of the tip was selected.

In order to clear the share display area 23, the user can press the clear button 11 ("C/CE" button) clearing all values from the main display area 22, and pressing again of the clear button 11 clearing all values from the share display area 23. Alternatively, the user can press the on button 11 ("ON/AC" button) clearing all values from the main display area 22, and pressing again of the on button 11 clearing all values from the share display area 23.

Figure 4:
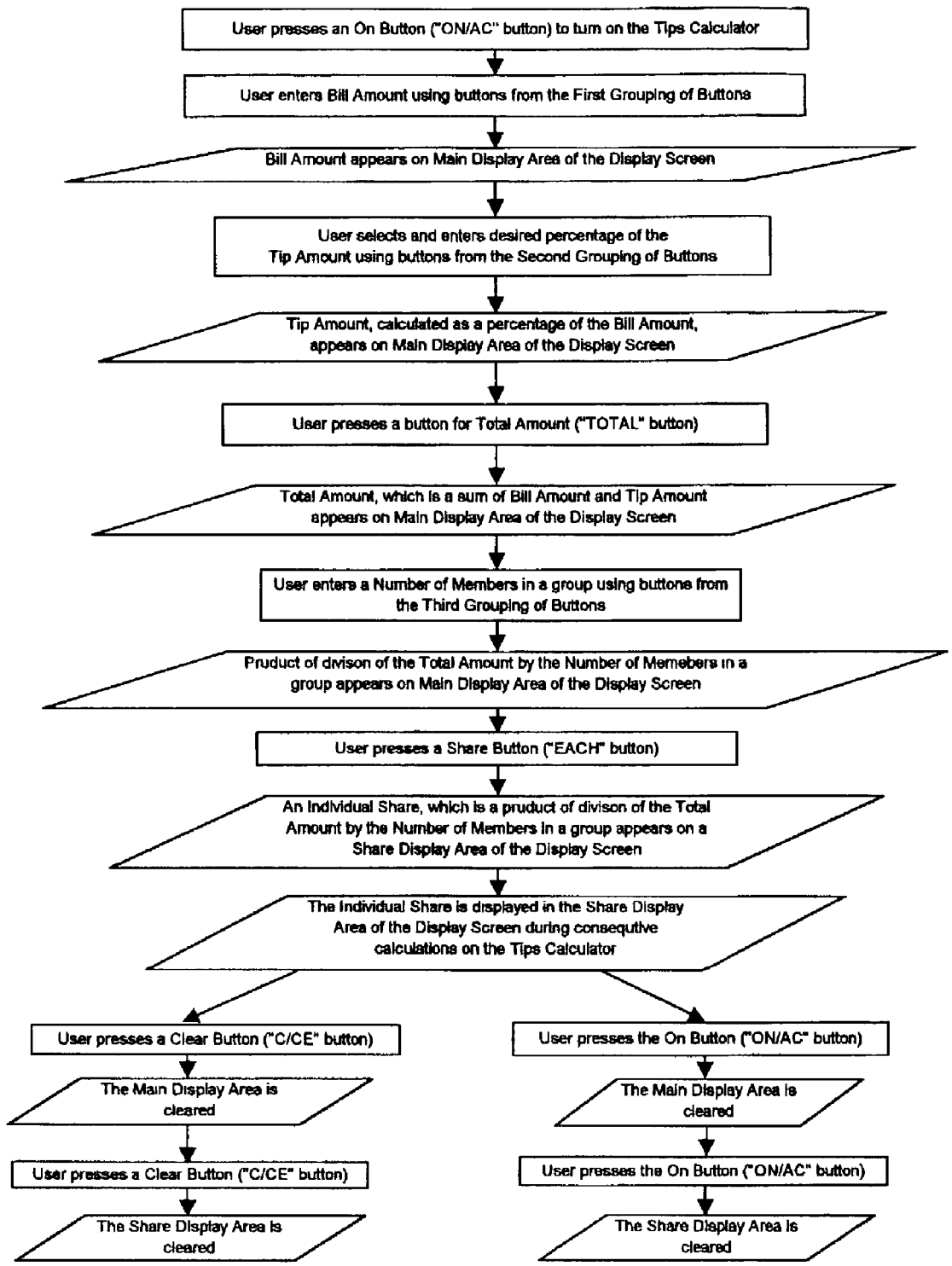
FIG. 4 is a flow chart of the method of calculation of the tip amount using the tips calculator, where the bill and the tip have to be split among members of a group.

The above-described method of calculation of the tip amount for each user in a group is outlined in the flow chart of the FIG. 4.

All the programming and construction of the tips calculator 1 aimed at performing of functions and calculations designated by buttons in the plurality of groupings of buttons is accomplished by means well know in the art. Similarly, means for display of values, functions and results of calculations on the display screen 2 is a means well known in the art. Additionally, functioning of a necessary power source for the tips calculator 1 is accomplished by means well known in the art.

The dimensions of the tips calculator 1 could vary. In one preferred embodiment, the base member 20 of the tips calculator 1 could have a size and shape that allows for convenient placement inside of a check presentation book. The waiter would enter the bill total on the tips calculator 1 using the buttons in the first grouping of buttons 3 and present the check in the check presentation book. Upon opening of the check presentation book, the user only has to press a few buttons on the tips calculator 1 to know how much to pay with tip added.

In another preferred embodiment, the base member 20 of the tips calculator 1 could also have a credit card size, as shown in FIG. 1, which allows for easy storage in a wallet. With tips calculator 1 always at hand in the wallet of the user, calculation of a tip for a taxi ride or a haircut is now a simple and convenient task since calculation steps have been simplified. Also, as shown in FIG. 2, the base member 20 of the tips calculator 1 could have an oblong "ruler" shape, which has an added advantage of serving a function of a ruler.

Additionally, the face side 21 of the base member 20 of the tips calculator 1 could have an advertisement area 13 for display of an advertisement information.

It will be further understood that the embodiments described herein are merely exemplary and that a person skilled in the art may make variations and modifications without departing from the spirit and scope of the invention. All such variations and modifications are intended to be included within the scope of the appended claims.

What is claimed is:

1. A tips calculator, comprising:
a base member having a face side, wherein the face side has at least one display screen having a main display area and a share display area;
a plurality of groupings of buttons, wherein:
a first grouping of buttons includes buttons designating whole numbers from 0 to 9 and buttons designating at least mathematical functions of a decimal point, addition, subtraction, multiplication, division, and sum total, as well as an on button for turning on of the tips calculator and an off button for turning off the tips calculator, and a clear button for clearing of the main display area, whereby the first grouping of buttons is used to at least enter a bill amount, wherein the bill amount is displayed on the main display area;
a second grouping of buttons includes buttons designating tip amounts as percentages of the bill amount in one percent increments and in a range from 10 percent to at least 25 percent, and includes a button for a total amount, whereby buttons designating tip amounts are used to enter a choice of a tip amount as a percentage of the bill amount with subsequent display of the tip amount on the main display area, and whereby the button for the total amount is used to obtain a total amount, which is a sum of the bill amount and the tip amount, wherein the total amount is displayed on the main display area;
a third grouping of buttons includes buttons designating numbers of members in a group as whole sequential numbers from 2 up to at least 12, whereby buttons designating numbers of members in a group are used to select a number of members in a group and to obtain a display on the main display area of an individual share, wherein the individual share is a product of a division of the total amount by the number of members in a group and, furthermore, the third grouping of buttons additionally includes a share button for a display in the share display area of the individual share during performance of consecutive calculations on the tips calculator;
means for performing functions and calculations designated by buttons in the plurality of groupings of buttons; and means for display on the display screen of values, functions, and results of calculations designated by buttons in the plurality of groupings of buttons.

2. The tips calculator of claim 1, wherein:

a consecutive engagement of the clear button clears the individual share from the share display area.

3. The tips calculator of claim 1, wherein:

an engagement of the on button while the tips calculator is turned on clears the main display area and a consecutive engagement of the on button clears the individual share from the share display area.

4. The tips calculator of claim 1, wherein:

the face side of the base member has an advertisement area for display of an advertisement information.

\* \* \* \* \*